United States Patent [19]

Hamada et al.

[11] 4,331,439

[45] May 25, 1982

[54] PROCESS FOR PREVENTING COLOR MIGRATION IN COLORED MOLDINGS OF POLYOXYMETHYLENE RESINS

[75] Inventors: Minoru Hamada; Hisaya Sakurai, both of Kurashiki; Jyunzo Masamoto, Fuji; Takeo Yoshida; Hiroshi Hazawa, both of Kurashiki, all of Japan

[73] Assignee: Asahi Kasei Kogyo Kabushiki Kaisha, Osaka, Japan

[21] Appl. No.: 218,364

[22] Filed: Dec. 19, 1980

Related U.S. Application Data

[63] Continuation of Ser. No. 66,388, Aug. 14, 1979, abandoned.

[30] Foreign Application Priority Data

Aug. 24, 1978 [JP] Japan .................................. 53-102263

[51] Int. Cl.³ ............................................... D06P 5/02
[52] U.S. Cl. ........................................ 8/442; 8/506; 8/582; 8/583
[58] Field of Search .................... 8/506, 582, 583, 442

[56] References Cited

U.S. PATENT DOCUMENTS 3,134,636  5/1964  Singleton ............................... 8/649
4,029,467  6/1977  Defago et al. .......................... 8/470

*Primary Examiner*—A. Lionel Clingman
*Attorney, Agent, or Firm*—Birch, Stewart, Kolasch and Birch

[57] ABSTRACT

This invention deals with the coloring or dyeing of polyoxymethylene resins and particularly with preventing color migration therein. Color migration in molded articles of colored polyoxymethylene resins is prevented by dyeing the articles with disperse dyes, and treating the articles with a compound having one or more isocyanate groups, for example, a urethane prepolymer.

17 Claims, No Drawings

PROCESS FOR PREVENTING COLOR MIGRATION IN COLORED MOLDINGS OF POLYOXYMETHYLENE RESINS

This application is a continuation, of copending application Ser. No. 066,388, filed on Aug. 14, 1979 now abandoned.

BACKGROUND OF THE INVENTION

This invention relates to a process for dyeing molded articles of polyoxymethylene resins with disperse dyes, and to the products obtained by this process.

Molded articles of polyoxymethylene resins are used as so-called engineering resins in various fields because of their excellent strength, friction- and abrasion-resistant properties, creep properties, fatigue properties and electrical properties.

Colored articles are employed in many of these utilities. The molded articles of polyoxymethylene resins are usually colored by organic or inorganic pigments. In one method, they are colored by using colored pellets which have previously been prepared by mixing the resins with a pigment of the desired coloring in an extruder. In another method, colored articles are molded by feeding pellets covered with a pigment directly into an injection molding machine. However, these methods have several disadvantages. In the former case, for example, it is necessary to have in stock the pellets of various colors. The latter case involves problems such as the tainting of articles with another pigment on the molding machine hopper and ill-dispersed pigments. Moreover, depending upon the types of pigments employed, some of the pigments used in these methods may adversely affect the thermal stability of the polymers, and cause problems such as decomposition at the time of molding.

Meanwhile, it has been attempted in some studies to dye the molded articles of polyoxymethylene resins with dyestuffs. See, for example, U.S. Pat. No. 3,134,636 and S. J. Barker and M. B. Price, "Polyacetals", ILIFFE Books, London, p. 138, Lines 10–26. According to the processes disclosed in these references, polyoxymethylene is dyed easily by disperse dyestuffs, but such dyestuffs are disadvantageous in that they are extracted with substances such as oils on the skin surface thereof, and such as dioctyl phthalate, in which these dyestuffs are soluble.

This problem must also be solved in those utilities where the molded articles of polyoxymethylene resins come in contact with polyvinyl chloride leather or other materials containing dyestuff-dissolving substances such as dioctyl phthalate. These fields of use include, e.g., the inner door handles of automobiles, ski bindings, toy parts, parts of construction materials, buttons, and slide fasteners for apparel. For this reason, these methods have not yet been commercialized.

DETAILED DESCRIPTION OF THE INVENTION

As a result of intensified studies to solve the aforementioned problems of color migration in the dyeing of molded articles of polyoxymethylene resins with disperse dyestuffs, the inventors have discovered quite an effective means of preventing such color migration.

This invention relates, in particular, to a process for dyeing polyoxymethylene resins, which is characterized by using a compound having at least one isocyanate group in the molecule when an article of a polyoxymethylene resin is dyed with a disperse dyestuff.

According to this invention, a remarkable improvement in overcoming the problem of color migration observed when molded articles of polyoxymethylene resins are dyed is obtained. Thus, the molded articles thereof can be actually dyed by preparing non-colored natural pellets and dyeing them with a variety of colors, as desired, thereby solving the aforementioned problems in connection with coloring such articles with pigments.

The polyoxymethylene used in this invention refers to a polyoxymethylene homopolymer or a polyoxymethylene copolymer, which is obtained by polymerizing formaldehyde or cyclic oligomers of formaldehyde, such as trioxane or tetraoxane, either alone or copolymerizing one of them with one or more comonomers copolymerizable therewith (such as, e.g., ethylene oxide and 1,4-butanediol formal), and which is stabilized against decomposition from terminal groups. Such a homo- or copolymer has a number average molecular weight of 20,000 or higher. In using a polyoxymethylene, there are added usually a thermal stabilizer, an anti-oxidant, and if necessary, a pigment. In addition, other well known additives and other types of polymers may be added.

The process of this invention for dyeing molded articles of polyoxymethylene resins is usually applied to the molded articles (described hereinbelow in detail) made by injection molding, extrusion molding, blow molding or rotary molding of polyoxymethylenes. These articles have various shapes including block, film, sheet, pipe, rod and monofilament embodiments. As for the thickness of the articles, there is no specified limit, and the invention may be applied to very thin and very thick articles. In the case of thick articles, the dyestuff permeates only the surface layer, leaving the central part undyed. Nevertheless, the object of this invention is fulfilled sufficiently.

The disperse dyestuffs used in this invention include ordinary dyestuffs, disperse dyestuffs of a developing type having a diazotizable amino group, and the disperse dyestuffs which are capable of forming metal complexes. As examples of such disperse dyestuffs, there may be mentioned, for example, C.I. Disperse Yellow 1, C.I. Disperse Yellow 3, C.I. Disperse Yellow 7, C.I. Disperse Yellow 23, C.I. Disperse Orange 3, C.I. Disperse Orange 5, C.I. Disperse Orange 13, C.I. Disperse Red 4, C.I. Disperse Red 7, C.I. Disperse Red 58, C.I. Disperse Blue 7, C.I. Disperse Blue 27, C.I. Disperse Blue 87, and C.I. Disperse Black 1. Among them, the preferred dyestuffs are those having —OH, —SH, —NHR (wherein R is alkyl), —NH$_2$, —OR (R is alkyl), —COOR (R is alkyl) and —CN groups, such as C.I. Disperse Orange 13, C.I. Disperse Yellow 1, and C.I. Disperse Blue 87.

The compounds having isocyanate groups used in accordance with the present invention include organic compounds having at least one isocyanate group, preferably two or more isocyanate groups, in the molecule. These compounds include, for example, hexamethylene diisocyanate (HMDI), 2,4-tolylene diisocyanate, 4,4'-diphenylmethane diisocyanate, meta-xylylene diisocyanate, phenyl isocyanate, para-chlorophenyl isocyanate, 1,5-naphthalene diisocyanate, polymethylene polyphenyl isocyanate, triphenylmethane triisocyanate, trans-vinylene diisocyanate, isophorone diisocyanate, 4,4',4''-trimethyl-3,3',3''-triisocyanate-2,4,6-triphenyl cyanurate, HMDI derivatives (e.g., HMDI adducts), dimeryl diisocyanate, hydrogenated tolylene diisocyanate, and polymethylene polyphenyl isocyanate. Among the above-cited isocyanate compounds, those having two or more isocyanate groups are preferred. Depending on the coloring of the dyed articles, the preferred compounds are non-yellowing isocyanates, such as hexamethylene diisocyanate, hydrogenated tolylene diisocyanate, p-xylylene diisocyanate, m-xylylene diisocyanate, ditolyl diisocyanate, and hydrogenated 4,4′-diphenylmethane diisocyanate.

In addition, there may be used urethane polymers having an isocyanate group at a terminal position, which are obtained by reacting a polyhydroxy compound with an isocyanate. These polyhydroxy compounds include (1) polyesters obtained by reacting polybasic acids such as dicarboxylic acids (e.g., phthalic, adipic, dimerized linoleic, maleic, dimeric and sebacic acid) with hydroxyl compounds such as diols and triols (e.g., glycerine, polyglycerine, trimethylol propane, ethylene glycol, propylene glycol, butylene glycol, diethylene glycol, hexane triol, trimethylol ethane, pentaerythritol, hexanediol, etc.); (2) castor oil which is a mixture of glyceryl triricinolate, -diricinolate, -monooleate, and -monoricinolate; and (3) poly(oxypropylene)glycol, poly(oxypropylene)poly(oxyethylene)glycol, poly(oxytetraethylene)glycol, poly(oxytetramethylene)glycol, poly(oxyethylene)glycol, poly(oxypropylene)triol, poly(oxypropylene)poly(oxyethylene)triol, and addition compounds of sorbitol, pentaerythritol, sucrose, phosphorus and ethylene diamine with ethylene oxide and propylene oxide.

There can also be used those compounds having masked isocyanate groups which are protected by reacting the isocyanate groups of the above-cited compounds having isocyanate groups with compounds having in the molecule an active hydrogen capable of reaction with isocyanates and radicals capable of forming anionic salts, such as bisulfite salts, tertiary alcohols, ketoximes, aminosulfonic acids, aminocarboxylic acids, and hydroxy acids. As examples thereof, there may be mentioned "Coronate AP" supplied by Nippon Polyurethane Co., Ltd. of Japan and "Elastron" supplied by Dai-ichi Kogyo Seiyaku Co., Ltd. of Japan. When these compounds having masked isocyanate groups are used, the treatment in accordance with the invention can be effected in an aqueous solution. This is advantageous in the aspects of the ease of industrial handling and cost.

Among the urethane prepolymers described above, particularly those which contain 10 wt. % or more of an oxyethylene chain are preferred. In order to obtain such a prepolymer, there can be used as a reaction component polyethylene glycol, the copolymerized polyether of ethylene oxide and propylene oxide, and a polyol prepared by adding ethylene oxide to a polyester.

Thus, where a urethane prepolymer is used, the effect of the treatment to prevent color migration is improved when the prepolymer contains the oxymethylene chain to the indicated extent of at least 10% by weight. Furthermore, if a prepolymer having masked free isocyanate groups is used, it can be handled as an aqueous solution or dispersion.

A molar ratio of isocyanate group to active hydrogen atom of 1 or more can be freely selected in synthesizing the abovementioned urethane prepolymers.

Among the compounds having isocyanate groups used in this invention, those having masked isocyanate groups are either dispersed or dissolved in water or an organic solvent (such as, for example, benzene, toluene, xylenes, hexane, n-heptane, benzyl alcohol, methylene chloride, etc.). Other isocyanate compounds are dispersed or dissolved in an organic solvent which does not react with an isocyanate group (e.g., benzene, toluene, xylenes, hexane, and n-heptane).

The following description is directed to a preferred embodiment of the process of this invention for dyeing molded articles of polyoxymethylene resins.

The molded articles of polyoxymethylene resins are dyed in a dye bath comprising water containing a disperse dyestuff at a suitable concentration and, if necessary, a dyeing assistant such as benzyl alcohol, methanol, or ethylene glycol at a temperature in the range of 90°–130° C. for 10 to 60 minutes. Thereafter, the dyed articles are subjected to reducing washing and water washing, and are dried. (The dyeing operation can also be done in an organic solvent.)

The dyed articles are then treated in an organic solvent (toluene, benzene, etc.) containing a compound having isocyanate groups, and if required, a catalyst such as an amine or a tin compound, a crosslinking agent such as polyols, and a dyeing assistant such as acetone, methanol, triethanolamine, or ethylene glycol. After treatment, the solvent is removed by water washing.

The preferred conditions for this treatment are a concentration of 0.1 to 30 wt. % for the compound having isocyanate groups, a treating temperature of 50° to 150° C., and a treating period of 5 to 120 minutes. An optimum set of conditions can be determined by those skilled in this art, depending upon the type of compound having isocyanate groups to be employed, the type of solvent, and the shape of the molded articles. If a toluene solution of hexamethylene diisocyanate, for example, is used, a satisfactory result can be obtained when employing such conditions as a concentration of 2–5%, a temperature of 70°–90° C. and a treating period of 30–60 minutes.

If a masked isocyanate compound is used, the molded articles which have been dyed in a similar manner as described above are treated in water or an organic solvent containing the masked isocyanate compound alone, or if required, containing additionally the aforementioned catalyst, crosslinking agent and dyeing assistant. After this treatment, the articles are dried to remove water or the solvent, at a temperature in which the isocyanate compound is not unmasked, and further treated thermally at a necessary temperature. The temperature, in which masked isocyanate compounds are kept from unmasking, is somewhat varied, depending upon the type of masking agents. It is preferable, therefore, to change the temperature in accordance with the masking agent used. If phenol, for example, is used as the masking agent, a temperature of 170° C. or lower is especially preferred. With acetoacetic ester and sodium bisulfite, the especially preferred temperatures are 140° C. or lower and 70° C. or lower, respectively. It is to be understood, however, that the object of this invention is fully attained even when articles are dried at temperatures higher than the above-specified temperatures at which the isocyanate compounds are not unmasked.

If a masked isocyanate compound is used, the dyeing and treating can be simultaneously carried out by dyeing the articles in a dye bath containing a disperse dye, an assistant such as methanol, a masked urethane prepolymer, and if required, other additives in water or an organic solvent, and by treating the articles thermally to remove water or the organic solvent.

The process of this invention involving the treatment with an isocyanate compound is not limited to the aforementioned embodiment, but is intended to include any operation which permits the reaction of isocyanate groups to be brought to completion after a disperse dye and an isocyanate compound have been allowed to permeate the molded articles of polyoxymethylene resins.

The molded articles contemplated in this invention include, for example, audio-cassette hubs, the tape reels of videotape recorders, various electrical parts such as coil bobbins, mechanical parts such as gears and bearings, automobile parts such as window regulator handles, blinker elements, wiper gears, door locks, speedometer gears, outer door handles, inner door handles, and mirror bases, bicycle parts, indicator wheels for various types of counters, ski bindings, the housing of disposable lighters, the neck pieces of electric fans, shower heads, sprinkler heads, garden sprayers, various shapes of fasteners for apparel and for industrial use, construction parts, buttons, and the like.

EXAMPLES OF THE INVENTION

The following Examples are given merely as illustrative of the present invention and are not to be considered as limiting. Unless otherwise noted, all parts and percentages are by weight.

EXAMPLES 1-13 AND COMPARATIVE EXAMPLE 1

To 100 parts by weight of polyoxymethylene diacetate [MI (190° C., weighing 2,160 g)≈14 g/10 min], there were added 0.5 part by weight of a terpolymeric polyamide of caprolactam/hexamethylene adipamide/hexamethylene sebacamide (52/20/28) (hereinafter referred to as PA) and 0.4 part by weight of 2,2'-methylenebis-(4-methyl-6-t-butylphenol) (hereinafter referred to as 2246) to give a 5-kg composition, which was molded into 5×10×3 mm test strips (hereinafter referred to as test strips A) in an injection molding machine.

These test strips A were dyed at 130° C. for 30 minutes in a dye bath containing the following ingredients:
Ethylene glycol: 1 ml.
Kayalon Polyester Orange B—(C.I. Disperse Orange 13), conc., supplied by Nippon Chemiphar of Japan: 1 g.
Water: 99 ml.

The test strips A were then subjected to reducing washing at 80° C. for 30 minutes, using a liquid consisting of the following ingredients (hereinafter referred to as the reductive washing liquid B):
Hydrosulfite: 2 g.
Caustic soda: 2 g.
Ethylene glycol: 2 g.
Water: 1 liter.

The test strips A were then washed with hot water at 90° C. for 20 minutes and dried to give test samples. The samples thus obtained were directly tested for color migration in Comparative Example 1. On the other hand, in Examples 1-13, the samples obtained were treated in the treatment solutions given in Table 1 under the conditions shown in the same Table, washed with water and dried under the conditions as outlined therein, and if necessary, treated thermally, before the samples were tested for color migration.

The color migration tests were conducted in the following manner. The aforementioned test samples were overlaid on sheets (10×20×3 mm) of plasticized polyvinyl chloride containing 40% dioctyl phthalate, and put under a load of 4.5 kg. These samples were placed in a desiccator containing water and left to stand at a controlled temperature of 37°±3° C. for 48 hours. At the end of this period, the samples were visually observed to examine the extent to which the dyestuff had migrated to the surfaces of the polyvinyl chloride sheets. All of the color migration tests were conducted essentially in this manner. The test results are given in Table 1.

TABLE 1

| Example No. | Composition of Treatment Solution | | | | Dipping Treatment | | Water-washing Condition | | Drying Condition | | Thermal Treatment Condition | | Extent of Color Migration |
|---|---|---|---|---|---|---|---|---|---|---|---|---|---|
| | Solvent (ml) | Isocyanate Compound (ml) | Catalyst (g/ml) | Assistant (ml) | Temperature (°C.) | Time (minute) | Temperature (°C.) | Time (minute) | Temperature (°C.) | Time (minute) | Temperature (°C.) | Time (minute) | |
| Comparative Example 1 | — | — | — | — | — | — | — | — | — | — | — | — | Very high |
| Example 1 | Toluene (95) | Hexamethylene diisocyanate (5) | — | — | 70 | 60 | 60 | 10 | 80 | 5 | — | — | Little |
| 2 | Toluene (50) | Hexamethylene diisocyanate (50) | — | — | 70 | 60 | 60 | 10 | 80 | 5 | — | — | Little |
| 3 | Toluene (99.5) | Hexamethylene diisocyanate (0.5) | — | — | 70 | 60 | 60 | 10 | 80 | 5 | — | — | Slight |
| 4 | Toluene (95) | Hexamethylene diisocyanate | Dibutyl-tin-di-2-ethylhexoate | — | 70 | 60 | 60 | 10 | 80 | 5 | — | — | Little |

TABLE 1-continued

| Example No. | Composition of Treatment Solution | | | | Dipping Treatment | | Water-washing Condition | | Drying Condition | | Thermal Treatment Condition | | Extent of Color Migration |
|---|---|---|---|---|---|---|---|---|---|---|---|---|---|
| | Solvent (ml) | Isocyanate Compound (ml) | Catalyst (g/ml) | Assistant (ml) | Temperature (°C.) | Time (minute) | Temperature (°C.) | Time (minute) | Temperature (°C.) | Time (minute) | Temperature (°C.) | Time (minute) | |
| | | (5) | (0.2) | | | | | | | | | | |
| 5 | Toluene (80) | 4,4'-Diphenylmethane diisocyanate (20) | — | — | 70 | 60 | 60 | 10 | 80 | 5 | — | — | Little |
| 6 | Toluene (97.5) | Phenyl isocyanate (2.5) | — | — | 70 | 60 | 60 | 10 | 80 | 5 | — | — | Slight |
| 7 | Heptane (70) | 2,4-Tolylene diisocyanate (30) | — | — | 80 | 60 | 60 | 10 | 80 | 5 | — | — | Little |
| 8 | Water (95) | Elastron H-3* (5 g based on solids) | — | — | 100 | 60 | 60 | 10 | 80 | 10 | 130 | 5 | Slight |
| 9 | Water (95) | Elastron H-3* (5 g based on solids) | — | Ethanol (5) | 100 | 60 | 60 | 10 | 80 | 10 | 130 | 5 | Little |
| 10 | Water (90) | Elastron H-3* (10 g based on solids) | — | — | 110 | 60 | 60 | 10 | 80 | 5 | 130 | 10 | Little |
| 11 | Triethyleneglycol diacetate (95) | Adduct of hexamethylene diisocyanate with Na bisulfite (5 g) | — | — | 70 | 120 | 60 | 20 | 70 | 10 | 100 | 5 | Little |
| 12 | Water (90) | Adduct of hexamethylene diisocyanate with Na bisulfite (10 g) | — | — | 70 | 120 | 60 | 10 | 70 | 10 | 100 | 10 | Slight |
| 13 | Water (80) | Adduct of urethane prepolymer** with Na salt of taurine (20 g) | — | — | 100 | 60 | 60 | 10 | 80 | 5 | 130 | 5 | Slight |

Note:
*Product of Dai-ichi Kogyo Seiyaku Co., Ltd. (Japan)
**Obtained by the reaction of tolylene diisocyanate with a polyether ester (molecular weight: 1200) prepared from maleic anhydride and diethylene glycol

EXAMPLE 14 AND COMPARATIVE EXAMPLE 2

To 100 parts by weight of polyoxymethylene diacetate [MI (190° C., weighing 2,160 g)≈20.5 g/10 min], there were added 0.75 part by weight of PA (the terpolymeric polyamide described in Example 1) and 0.4 part by weight of 2246 to give a 5-kg composition, which was molded into 5×10×3 mm test strips (hereinafter referred to as test strips C) in an injection molding machine.

These test strips C were dyed at 130° C. for 60 minutes in a dye bath containing the following ingredients:

Ethylene glycol: 1 ml.
Kayalon Polyester Orange B conc. (Product of Nippon Chemiphar): 0.8 g.
Water: 99 ml.

The test strips C were then subjected to reducing washing at 80° C. for 30 minutes, using the same reductive washing liquid B as used in Example 1. The washed strips C were then washed with hot water at 90° C. for 20 minutes and dried to give test samples (hereinafter referred to as test strips D). In Comparative Example 2, the test samples D were directly tested for color migration.

Thirty five parts by weight of a polyester diol comprising adipic acid/1,6-hexanediol/bisphenol A (molar ratio of 4:3:2) was reacted with 40 parts by weight of polyethylene glycol having an average molecular weight of 1,000 and 20 parts by weight of xylylene diisocyanate under a nitrogen stream at 100° C. to give a urethane prepolymer (having 3.41 wt.% free NCO). The isocyanate groups of this urethane prepolymer were masked, using an aqueous sodium bisulfite solution, to give a stable aqueous emulsion (I) (containing 25% solids).

In a test designated as Example 14, the aforementioned test strips D were dipped in a 5% liquid of emulsion I (diluted to a solids content of 1.25%), treated at 110° C. for 60 minutes, dried in a hot air flow at 80° C. for 5 minutes, thermally treated at 130°0 C. for 10 minutes, and then tested for color migration. The results are given in Table 2.

TABLE 2

|  | Example 14 | Comparative Example 2 |
|---|---|---|
| Extent of color migration | Little observed | Very high |

EXAMPLE 15 AND COMPARATIVE EXAMPLE 3

To 100 parts by weight of a copolymer of trioxane and ethylene oxide (1 mol. %), from which unstable terminal groups have been removed [MI (190° C., weighing 2,160 g)≈9.5 g/10 min], there were added 0.1 part by weight of calcium ricinolate and 0.4 part by weight of 2246 to give a 2-kg composition, which was molded into 5×10×3 mm test strips in an injection molding machine.

These test strips were dyed at 100° C. for 30 minutes in a dye bath containing the following ingredients:
Ethylene glycol: 1 ml.
Kayalon Polyester Blue EBL-E (C.I. Disperse Blue 56), product of Nippon Chemiphar: 1 g.
Water: 99 ml.
The test strips were then subjected to reducing washing at 80° C. for 30 minutes, using the same reductive washing liquid B as used in Example 1. The washed strips were then washed with hot water at 90° C. for 20 minutes, and dried to give test samples. In Comparative Example 3, the test samples were directly tested for color migration.

In a test designated as Example 15, the samples obtained were dipped in a liquid (having a solids content of 2.5 wt. %) containing 10 parts by weight of the emulsion I described in Example 14, 5 part by weight of ethylene glycol and 85 parts by weight of water at 100° C. for 60 minutes. The samples were then washed with hot water at 60° C. for 20 minutes, dried with hot air at 80° C. for 5 minutes, and treated thermally at 130° C. for 10 minutes, before they were tested for color migration. The test results are given in Table 3.

TABLE 3

|  | Example 15 | Comparative Example 3 |
|---|---|---|
| Extent of color migration | Little observed | Very high |

EXAMPLES 16 AND 17 AND COMPARATIVE EXAMPLE 4

To 100 parts by weight of a copolymer of trioxane and ethylene oxide (1 mol. %), from which unstable terminal groups have been removed [MI (190° C., weighing 2,160 g)≈9.2 g/10 min], there were added 0.1 part by weight of calcium ricinolate and 0.4 part by weight of 2246 to give a 2-kg composition, which was molded into 5×10×3 mm test strips in an injection molding machine.

These test strips were dyed at 130° C. for 30 minutes in a dye bath containing the following ingredients:
Ethylene glycol: 1 ml.
Kayalon Polyester Light Blue BGL-S (C.I. Disperse Blue 87), product of Nippon Chemiphar): 1 g.
Water: 99 ml.
The test strips were then subjected to reducing washing at 80° C. for 30 minutes, using the same reductive washing liquid B as used in Example 1, then washed with hot water at 90° C. for 20 minutes, and dried to give test samples. In Comparative Example 4, the test samples were directly tested for color migration.

In the tests designated as Examples 16 and 17, the samples obtained were dipped in the liquids given in Table 4 under the conditions also shown in the same Table. Therefore, the samples were washed with water, dried and, if necessary, treated thermally, all under the conditions given in Table 4, before they were tested for color migration. The test results are set forth in Table 4.

TABLE 4

|  | Comparative Example 4 | Example 16 | Example 17 |
|---|---|---|---|
| Liquid Composition | — | 80 ml. toluene 20 ml. HMDI | 95 ml. toluene 5 g. urethane prepolymer* |
| Dipping Treatment Temperature | — | 70° C. | 100° C. |
| Time | — | 60 min. | 60 min. |
| Water Washing | — | 70° C. × 10 min. | 60° C. × 10 min. |
| Drying | — | 80° C. × 5 min. | 80° C. × 5 min. |
| Extent of color migration | Very high | Little | Slight |

*Obtained by the reaction of tolylene diisocyanate with a polyester (molecular weight of 1,200) of maleic anhydride and diethylene glycol.

EXAMPLES 18–23

The urethane prepolymers having the compositions as shown in Table 5 were synthesized in the same manner as in Example 14. The isocyanate groups of these prepolymers were masked, using an aqueous sodium bisulfite solution, to give aqueous emulsions which are stable in water and contain 25 wt. % solids.

Test samples D were treated with these emulsions in accordance with the manner described in Example 14 and then tested for color migration. The test results are given in Table 5, which indicates that the color migration in these Examples is quite small, as compared with that observed in Comparative Example 2.

TABLE 5

| Composition of urethane prepolymers | Example No. | | | | | |
|---|---|---|---|---|---|---|
| | 18 | 19 | 20 | 21 | 22 | 23 |
| Polyether* | 15 | 55 | 30 | 50 | 45 | 20 |
| 1,6-hexanediol | 2 | — | — | 3 | 2 | 1 |
| Polyester diol (Adipic acid, 10 moles 1,6-hexanediol, 6 moles Bisphenol A, 5 moles) | 63 | 25 | — | 25 | 28 | 68 |
| Polyester diol (Adipic acid, 4 moles 1,6-hexanediol, 3 moles neopentyl glycol 2 moles) | — | — | 45 | — | — | — |
| Hexamethylene diisocyanate | 20 | 20 | 25 | 22 | — | 15 |
| Hydrogenated 4,4'-diphenyl-methane diisocyanate | — | — | — | — | 25 | — |
| Free isocyanate (%) in urethane prepolymer | 5.51 | 4.61 | 6.19 | 6.29 | 4.13 | 4.10 |
| Extent of color migration | Slight | Little | Little | Little | Slight | Little |

*Polyether: In Examples 18, 19 and 20, polyethylene glycol (average molecular weight of 1,000); in Examples 21 and 22, a polyether diol of a block copolymer type (average m.w. of 2,300) obtained by adding ethylene oxide to polypropylene glycol (average m.w. of 1,000); in Example 23, polyethylene glycol (average m.w. of 2,000).

EXAMPLE 24

Toluene was added to the urethane prepolymer described in Example 22 to give a toluene solution having a solids content of 10%. The test strips D of Example 14 were dipped in this liquid at 70° C. for 20 minutes, washed with water, dried at 100° C. for 5 minutes, and then tested for color migration. Only a small amount of migration was observed in the test.

EXAMPLE 24

Toluene was added to the urethane prepolymer described in Example 22 to give a toluene solution having a solids content of 10%. The test strips D of Example 14 were dipped in this liquid at 70° C. for 20 minutes, washed with water, dried at 100° C. for 5 minutes, and then tested for color migration. Only a small amount of migration was observed in the test.

EXAMPLE 25 AND COMPARATIVE EXAMPLE 5

The test strips C of Example 14 were dyed at 100° C. for 30 minutes in a dye bath containing the following ingredients:
Ethylene glycol: 1 ml.
Kayalon Polyester Light Red B-S (C.I. Disperse Red 152), product of Nippon Chemiphar: 0.5 g.
Water: 99 ml.

The test strips were then subjected to reducing washing at 80° C. for 30 minutes, using the reductive washing liquid B, washed with hot water at 90° C. for 20 minutes, and dried. In Comparative Example 5, the test samples were directly tested for color migration.

A urethane prepolymer (5.29 wt. % free NCO) was obtained by reacting 27 parts by weight of a polyester diol prepared from adipic acid/1,6-hexanediol/bisphenol A (molar ratio of 10:7:4), 3 parts by weight of 1,4-hexanediol, 50 parts by weight of a block copolyether (average molecular weight of 2,400) obtained by adding ethylene oxide to polypropylene glycol (an average molecular weight of 1,200), and 20 parts by weight of hexamethylene diisocyanate under a nitrogen stream at 110° C. for one hour. The isocyanate groups of this urethane prepolymer were masked, using an aqueous potassium bisulfite solution, to give an aqueous emulsion II containing 25% solids.

In the test designated as Example 25, the test strips B of Example 14 were dyed at 90° C. for 60 minutes in a dye bath containing the following ingredients:
Ethylene glycol: 2 ml.
Kayalon Polyester Light Red B-S: 0.5 g.
Aqueous emulsion II: 10 g.
Water: 88 ml.

The dyed strips were washed with hot water at 90° C. for 20 minutes, dried at 80° C. for 10 minutes in hot air, treated thermally at 130° C. for 10 minutes, and tested for color migration. The test results are given in Table 6.

TABLE 6

| | Example 25 | Comparative Example 5 |
|---|---|---|
| Extent of color migration | Little observed | Very high |

EXAMPLE 26

In a similar manner as in Example 14, a urethane prepolymer (6.61 wt. % free isocyanate groups) was prepared from 45 parts by weight of a polyester diol comprising maleic acid/1,6-hexanediol/bisphenol A (molar ratio of 4:3:2), 30 parts by weight of polyethylene glycol (an average molecular weight of 1,000), and 25 parts by weight of hexamethylene diisocyanate. The isocyanate groups of this prepolymer were masked by means of an aqueous sodium bisulfite solution to give an aqueous emulsion III having a solids content of 25%. The test strips D were treated in the same manner as in Example 14, using the emulsion III, and tested for color migration. The test showed no evidence of migration.

The invention being thus described, it will be obvious that the same may be varied in many ways. Such variations are not to be regarded as a departure from the spirit and scope of the invention, and all such modifications are intended to be included within the scope of the following claims.

We claim:

1. A process for preventing color migration in molded articles of polyoxymethylene resins, which comprises molding a polyoxymethylene resin into a shaped article, dyeing said article in a dye bath comprising a solvent containing a disperse dye, and treating said article in a solvent containing a compound having at least one isocyanate group.

2. A process for preventing color migration according to claim 1, wherein the isocyanate-containing compound has at least two isocyanate groups.

3. A process for preventing color migration according to claim 1, wherein the isocyanate groups in the isocyanate-containing compound are masked.

4. A process for preventing color migration according to claim 3, wherein the isocyanate-containing compound is a compound in which the isocyanate groups are masked by a bisulfite salt.

5. A process for preventing color migration according to claim 1, wherein the isocyanate-containing compound is a urethane prepolymer.

6. A process for preventing color migration according to claim 5, wherein a component of said urethane prepolymer includes a polyisocyanate selected from the group consisting of (a) hexamethylene diisocyanate, (b) hydrogenated tolylene diisocyanate, (c) p-xylylene diisocyanate, (d) m-xylylene diisocyanate, (e) ditolyl diisocyanate, and (f) hydrogenated 4,4'-diphenylmethane diisocyanate.

7. A process for preventing color migration according to claim 1, wherein the isocyanate-containing compound comprises a treating liquid containing a urethane prepolymer which contains 10 wt. % or more of an oxyethylene chain and which has free isocyanate groups.

8. A process for preventing color migration according to claim 1, wherein the isocyanate-containing compound is a prepolymer containing 10 wt. % or more of an oxyethylene chain and having masked free isocyanate groups.

9. A process for preventing color migration according to claim 1, wherein said articles are dyed with a disperse dye in the presence of a compound having isocyanate groups, and then treated thermally.

10. A process for preventing color migration in molded articles of polyoxymethylene resins which comprises dyeing said articles in a dye bath comprising a solvent containing a disperse dye, and treating said articles in a solvent containing a compound having at least one isocyanate group.

11. A process for preventing color migration according to claim 10, wherein the isocyanate-containing compound has at least two isocyanate groups.

12. A process for preventing color migration according to claim 10, wherein the isocyanate groups in the isocyanate-containing compound are masked.

13. A process for preventing color migration according to claim 10, wherein the isocyanate-containing compound is a urethane prepolymer.

14. Molded articles having substantially no color migration obtained by the process of claim 1.

15. A process for preventing color migration according to claim 1, wherein said polyoxymethylene resin is a polyoxymethylene homopolymer or polyoxymethylene copolymer, which is obtained by polymerizing formaldehyde or a cyclic oligomer of formaldehyde alone or by copolymerizing formaldehyde or a cyclic oligomer of formaldehyde with one or more comonomers copolymerizable therewith.

16. A process according to claim 15, wherein said hompo-or copolymer has a number average molecular weight of 20,000 or higher.

17. A process according to claim 1, wherein said article is dipped in a solution containing said compound having at least one isocyanate group.

* * * * *